United States Patent [19]

Shikakura

[11] Patent Number: 5,684,893
[45] Date of Patent: Nov. 4, 1997

[54] IMAGE SIGNAL PROCESSING APPARATUS

[75] Inventor: Akihiro Shikakura, Kawasaki, Japan

[73] Assignee: Canon Kabushiki Kaisha, Tokyo, Japan

[21] Appl. No.: 70,857

[22] Filed: Jun. 3, 1993

[30] Foreign Application Priority Data

Jun. 29, 1992 [JP] Japan ................. 4-194963

[51] Int. Cl.$^6$ .................................. G06F 11/10
[52] U.S. Cl. ............... 382/232; 371/37.4; 371/37.7
[58] Field of Search .................. 382/22, 56, 232, 382/235; 358/105, 539; 371/37.1, 37.4, 37.8, 37.7; 348/384, 390

[56] References Cited

U.S. PATENT DOCUMENTS

| | | | |
|---|---|---|---|
| 4,682,215 | 7/1987 | Adachi | 358/539 |
| 4,852,102 | 7/1989 | Yamaguchi | 371/37.4 |
| 4,953,019 | 8/1990 | Shikakura | 358/133 |
| 4,955,022 | 9/1990 | Odaka | 371/37.4 |
| 5,070,503 | 12/1991 | Shikakura | 371/37.1 |
| 5,107,504 | 4/1992 | Nakamura et al. | 371/37.1 |
| 5,122,875 | 6/1992 | Raychaudhuri et al. | 348/390 |
| 5,140,532 | 8/1992 | Beckwith, Jr. et al. | 382/56 |
| 5,148,271 | 9/1992 | Kato et al. | 382/56 |
| 5,168,356 | 12/1992 | Acampora et al. | 348/384 |

*Primary Examiner*—Leo Boudreau
*Assistant Examiner*—Chris Kelley
*Attorney, Agent, or Firm*—Fitzpatrick, Cella, Harper & Scinto

[57] ABSTRACT

An image encoding apparatus includes an encoding unit for encoding an input image signal, a first-data-block generation unit for generating first data blocks, each including encoded data and first additional information, a second-data-block generation unit for generating second data blocks by dividing a string of the first data blocks after every predetermined amount of data, and adding second additional information to each first-data-block string, a first addition unit for adding a first error detecting/correcting code to each of the first data blocks, and a second addition unit for adding a second error detecting/correcting code to each of the second data blocks.

22 Claims, 7 Drawing Sheets

| 16 | 11 | 10 | 16 | 24 | 40 | 51 | 61 |
|----|----|----|----|----|----|----|----|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

FIG.4

IMAGE SIGNAL PROCESSING APPARATUS

BACKGROUND OF THE INVENTION

1. Field of the Invention

This invention relates to an image signal processing apparatus, and more particularly, to an apparatus which encodes and decodes image signals.

2. Description of the Related Art

Recently, in the field of digital transmission of color image signals, a technique to perform high-efficiency encoding of information has made progress, and high compression of data is being realized.

As a result, it becomes possible to receive excellent image signals via a transmission channel even at a low data rate.

On the other hand, due to such high compression of data, the influence on an image of an error of even one word increases.

Hence, it is necessary to take countermeasures against code errors in a transmission channel by adding an error detecting/correcting code or the like to the compressed encoded data.

Particularly, when using a transmission channel in which deterioration in the transmission quality is expected, such as when data are transmitted via a magnetic recording medium, a communication satellite or the like, attention must be paid to countermeasures against code errors.

FIG. 1 is a block diagram showing the schematic configuration of a conventional image transmission/reception system.

In FIG. 1, an image signal is input from input terminal 101. The input image signal is converted into a digital signal by an A/D (analog-to-digital) converter 102. The digitized image signal is encoded by high-efficiency encoding circuit 103, in which the amount (band) of information of the image signal is compressed.

The image data compressed by high-efficiency encoding circuit 103 is supplied to error-correcting encoding circuit 104, in which a parity bit (an error-correcting code) for correcting code errors is added, and the resultant data is transmitted to transmission channel 105.

Next, a description will be provided of the operation at the reception side.

The data string transmitted from transmission channel 105 is first stored in memory 106. Error correction circuit 107, which accesses memory 106, corrects errors using the above-described parity bit. The image data subjected to error-code correction is output from memory 106, and is input to high-efficiency decoding circuit 108.

High-efficiency decoding circuit 108 performs processing which is entirely inverse to the processing by the above-described high-efficiency encoding circuit 103. That is, the compressed amount (band) of information is expanded so that the data is decoded into the original digital image signal.

The decoded digital image signal is converted into an analog signal by D/A (digital-to-analog) converter 109, and is output from terminal 110 as an analog image signal.

As for the configuration of high-efficiency encoding circuit 103 shown in FIG. 1, that is, the method of image compression, various methods have been proposed. The so-called DCT (discrete cosine transform) method is typical of such color-image encoding methods.

By using the above-described compression method, a very efficient compression operation can be performed without causing deterioration in an image even if the amount of information is compressed to a small fraction of the original amount.

However, when information is compressed with a high compression ratio using the above-described compression method, the reproduced image is greatly influenced by a single erroneous unit of encoded data. For example, if an error is generated when variable-length encoding is performed in the above-described manner, decoding becomes impossible after the erroneous code. As a result, the image reproduced from data after the erroneous code is disturbed, and therefore a very awkward image is obtained.

In general, when performing compression with a high compression ratio, if a code error is produced in important data which serves as key data in a decoding operation, for example, if an uncorrectable code error is produced in "movement information" or the like when high compression is performed using movement compensation, the reproduced image is deteriorated.

Recently, in particular, the above-described compression method tends to be used even when the quality of transmission changes and deteriorates due to weather in a transmission channel, such as a communication satellite. Hence, there has been a demand for countermeasures to protect data against the generation of erroneous codes in a transmission channel.

A countermeasure against errors can be strengthened by increasing the capacity of an error-correcting code. This approach, however, increases the redundancy of codes, reducing the effect of high compression.

SUMMARY OF THE INVENTION

It is an object of the present invention to overcome the above-described problems.

It is another object of the present invention to provide an image encoding apparatus using an error detecting/encoding method in which the influence of a code error on the reproduced image is minimized without increasing the redundancy of data.

According to one aspects the present invention which achieves these objectives relates to an image encoding apparatus comprising encoding means for encoding an input image signal, first-data-block generation means for means generating first data blocks, each including encoded data and first additional information, second-data-block generation means for generating second data blocks by dividing a string of the first data blocks after every predetermined amount of data and adding second additional information to each resulting first-data-block strings first addition means for adding a first error detecting/correcting code to each of the first data blocks, and second addition means for adding a second error detecting/correcting code to each of the second data blocks.

The foregoing and other objects, advantages and features of the present invention will become more apparent from the following detailed description of the preferred embodiment taken in conjunction with accompanying drawings.

BRIEF DESCRIPTION OF THE DRAWINGS

FIG. 4 is a diagram illustrating an example of quantized matrix elements;

DETAILED DESCRIPTION OF THE PREFERRED EMBODIMENT

A detailed description will now be provided of encoding and decoding operations of an image signal according to the preferred embodiment of the present invention.

Figure 1:
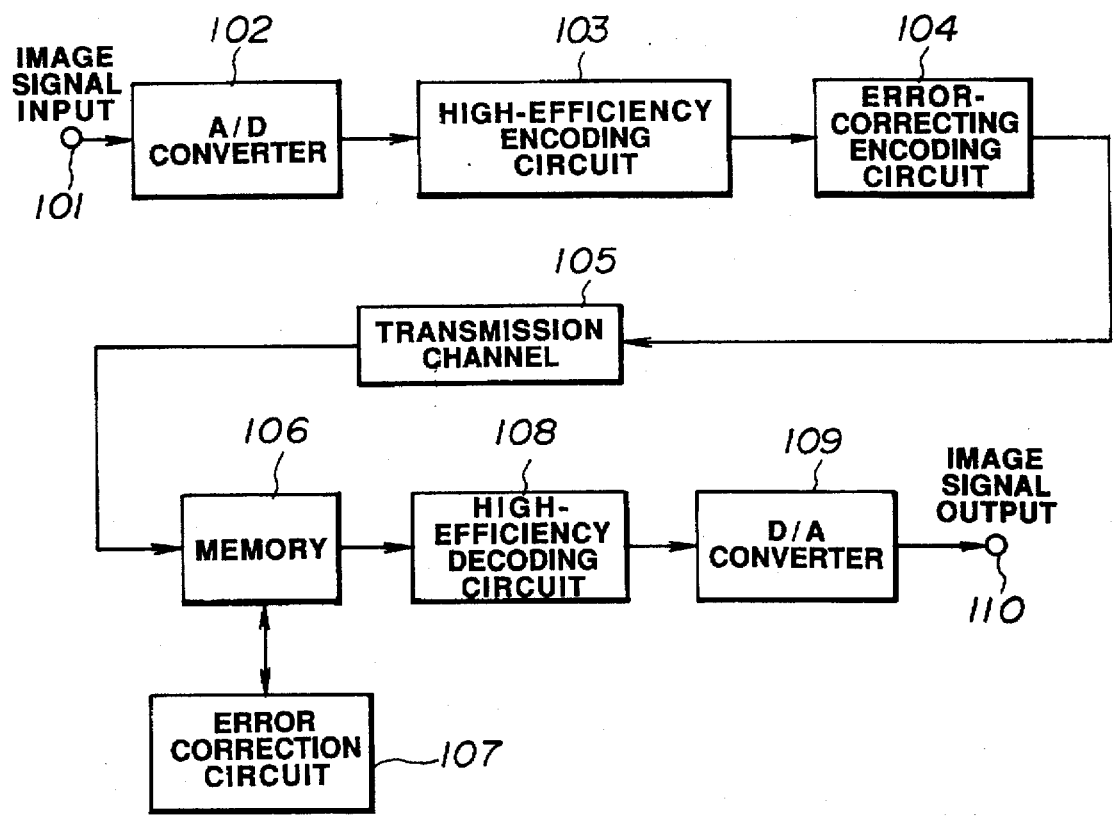
FIG. 1 is a block diagram showing the schematic configuration of a conventional image transmission/reception system.
Figure 2:
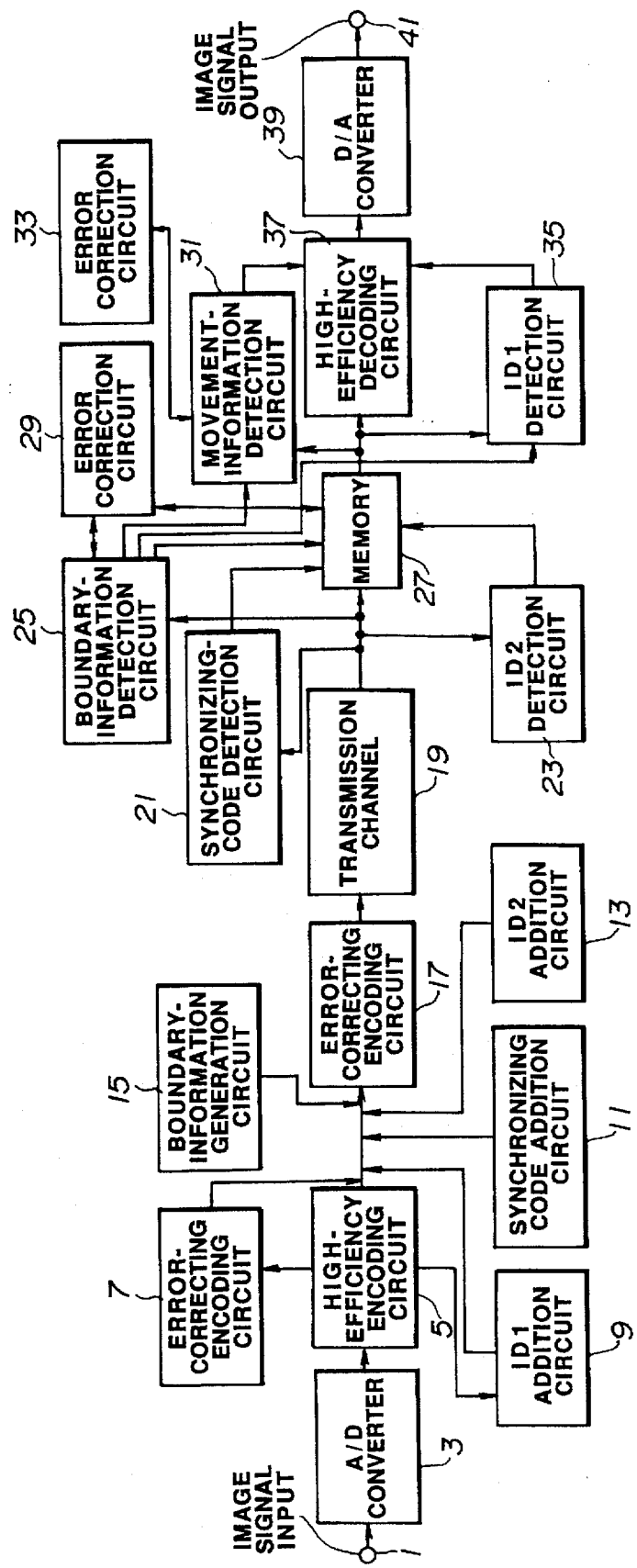
FIG. 2 is a block diagram showing the configuration of an image transmission/reception system according to a preferred embodiment of the present invention.

FIG. 2 is a block diagram showing the configuration of an image transmission/reception system of the preferred embodiment.

In FIG. 2, an analog image signal input to input terminal 1 is digitized by A/D converter 3, and variable-length compression encoding using movement compensation is performed by high-efficiency encoding circuit 5.

Figure 3:
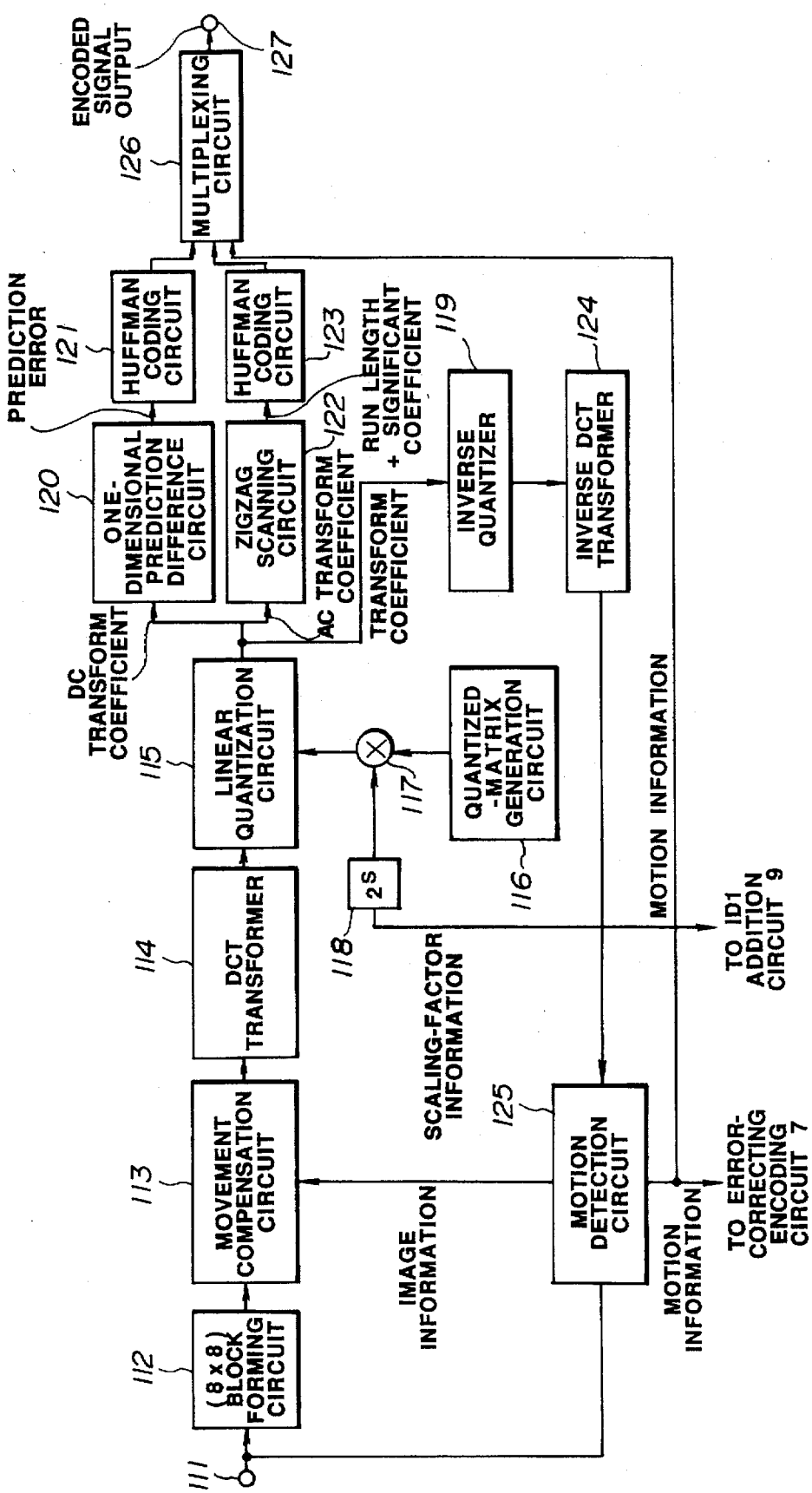
FIG. 3 is a block diagram showing the detailed configuration of high-efficiency encoding circuit 5 shown in FIG. 2.

A description will be provided of the detail of high-efficiency encoding circuit 5 with reference to FIG. 3.

In FIG. 3, an image signal input to input terminal 111 comprises an 8-bit (i.e., converted into 256 gradations for each color component) digital data string output from A/D converter 3 shown in FIG. 2. Three or four color components, such as RGB, YUV, YPbPr, YMCK or the like, may be used.

The input digital image signal is divided into sub-blocks, each comprising (8×8) pixels (picture elements), by block forming circuit 112. Digital data to be encoded are formed in units of a sub-block in movement compensation circuit 113 (to be described later in detail). The data are subjected to two-dimensional DCT in units of a sub-block in DCT transformer 114. Data comprising 8×8 words (hereinafter termed transform coefficients), after the DCT are quantized by linear quantization circuit 115. The quantization-step size differs for each transform coefficient. The quantization-step size for each transform coefficient has a value obtained by multiplying 8×8 quantized matrix elements generated from quantized-matrix generation circuit 116 by data ($2^s$) output from data generator 118 in multiplier 117. The quantized matrix elements are determined taking into consideration that luminosity for quantization noise differs for each of the transform coefficients comprising 8×8 words. An example of the quantized matrix elements is shown in FIG. 4.

The $2^s$ data is obtained from data generator 118. The value S equals 0, or a positive or negative integer, and is called a scaling factor. The picture quality and the amount of data are controlled by the value S. Information relating to the scaling factor is output to ID1 addition circuit 9 shown in FIG. 2.

The quantized transform coefficients are transmitted to inverse quantizer 119, where local decoding (to be described later) is performed. A DC component of transform coefficients in the (8×8) matrix shown in FIG. 4 is supplied to one-dimensional predictive difference circuit 120. A predictive error obtained from one-dimensional predictive difference circuit 120 is subjected to Huffman coding by Huffman coding circuit 121. More specifically, the quantized output including the predictive error is classified into groups. First, the identification number of the group to which the predictive error belongs is subjected to Huffman coding. Then, the corresponding value within the group is expressed by an equal-length code.

Figure 5:
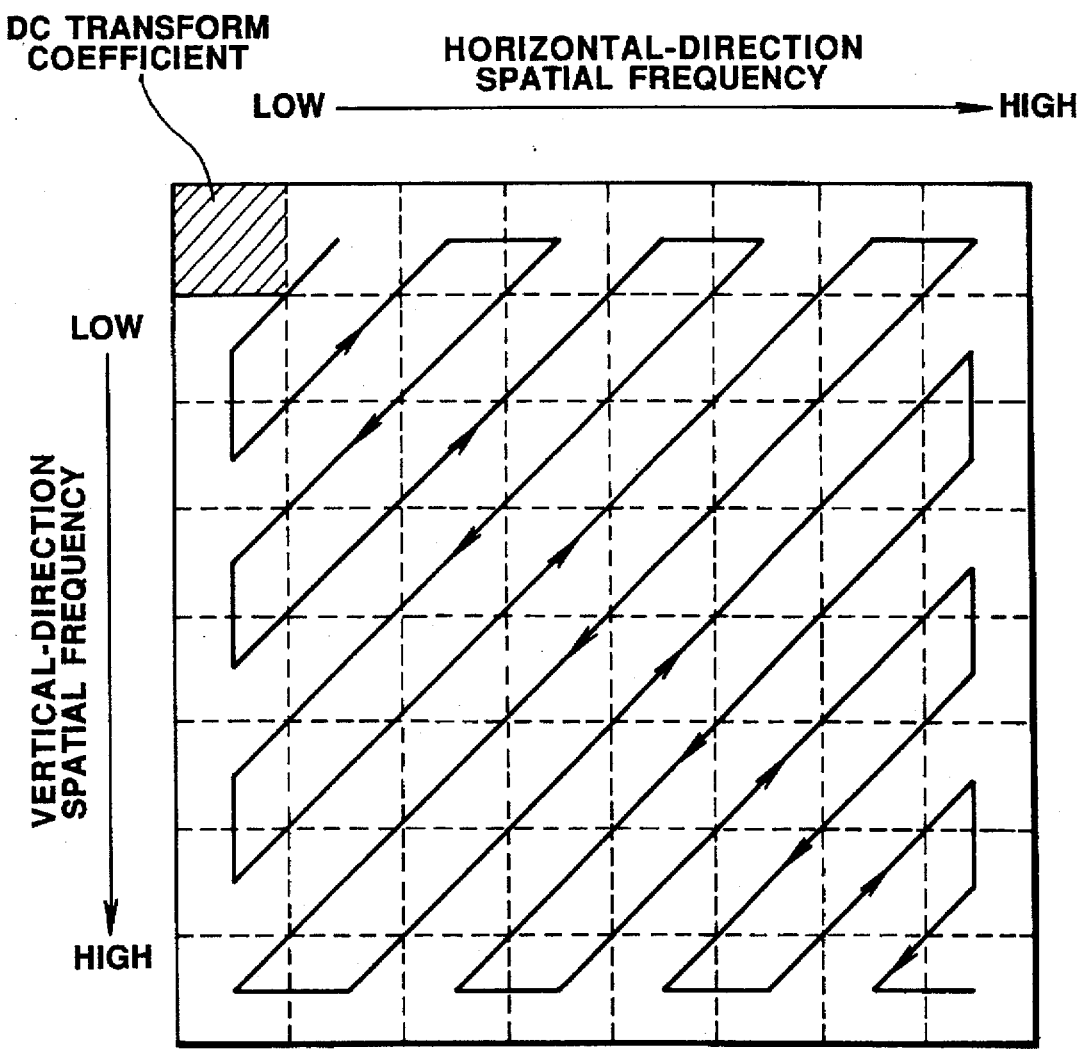
FIG. 5 is a diagram illustrating the meaning of zigzag scanning and DCT coefficients in an 8×8 block.

Transform coefficients other than the DC component, that is, AC transform coefficients (hereinafter termed "AC components"), are supplied to zigzag scanning circuit 122, where zigzag scanning is performed with a two-dimensional frequency from a low-frequency component to a high-frequency component, as shown in FIG. 5. Zigzag scanning circuit 122 outputs a combination of a transform coefficient whose quantized output is not 0 (hereinafter termed a "significant coefficient") and the number (run length) of transform coefficients whose quantized outputs equal 0 (hereinafter termed "nonsignificant coefficients") present between the above-described significant coefficient and the significant coefficient immediately before that significant coefficient to Huffman coding circuit 123.

Huffman coding circuit 123 classifies the obtained data into groups according to the value of the significant coefficient. First, a combination of the identification number of a group and the corresponding run length is subjected to Huffman coding. Then, the corresponding value within the group is expressed by an equal-length code.

The transform coefficients transmitted to inverse quantizer 119 are subjected to inverse quantization, and the resultant data are input to inverse DCT transformer 124 to be subjected to local decoding as digital data before encoding. The locally decoded digital data are input to movement detection circuit 125 to be reproduced into digital image data, which are stored for a predetermined time period (for example, a one-frame period). The stored digital image data are compared with the digital image data currently being input, whereby movement detection is performed. Movement detection circuit 125 transmits image data of the corresponding image for performing movement compensation to movement compensation circuit 113 in accordance with the detected movement information. Movement compensation circuit 113 forms digital data subjected to movement compensation, for example, by obtaining a difference value between the current image data and image data for movement compensation, and transmits the resultant data to the above-described DCT transformer 114.

In the present embodiment, movement detection circuit 125 performs movement detection in units of 8×8, and generates movement information, which is transmitted to error-correcting encoding circuit 7 and multiplexing circuit 126. The movement information comprises, for example, a movement vector, a movement detection mode (for example, information indicating movement detection between fields or frames), or the like. Error-correcting encoding circuit 7 generates a check bit of a first error detecting or correcting code defined in the present invention, and inserts the check bit at a predetermined position in the data string. The code generated by error-correcting encoding circuit 7 does not include a code subjected to compressed encoding.

Outputs from Huffman coding circuits 121 and 123, and movement information from movement detection circuit 125 are multiplexed by multiplexing circuit 126, and the resultant data are supplied from terminal 127 to error-correcting encoding circuit 17 (see FIG. 2) in the following stage as a encoded output.

Referring again to FIG. 2, ID1 addition circuit 9 inserts additional information, such as parameters (scaling factors) and the like used in compression by high-efficiency encoding circuit 5, at a predetermined position (in the present embodiment, for every 16 (8×8) blocks) in the above-described data string subjected to compression encoding.

Figure 6:
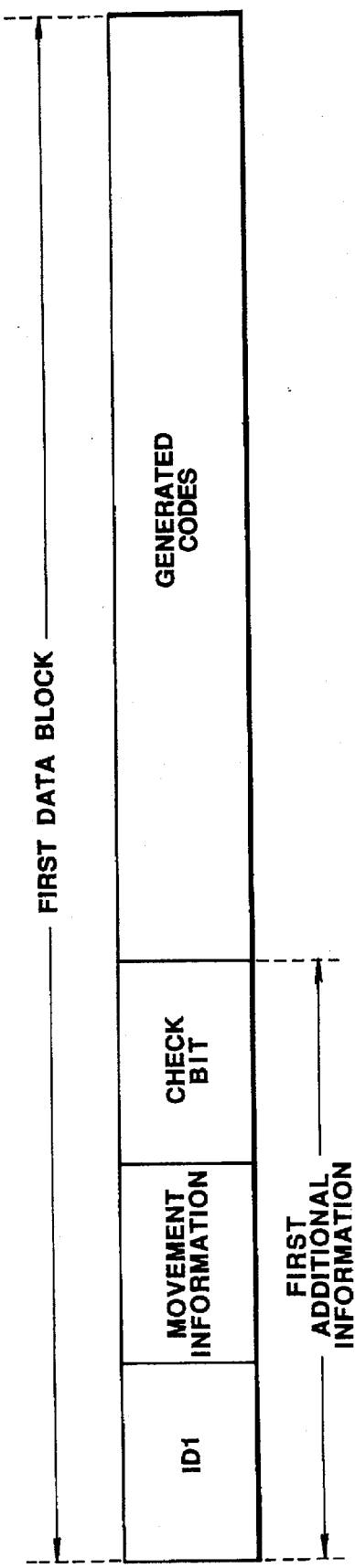
FIG. 6 is a diagram illustrating a data transmission format in the preferred embodiment.

According to such processing, the first data block shown in FIG. 6 is generated. In FIG. 6, the above-described movement information, the check bit of the error-correcting code, and ID1 (encoding parameters and the like) correspond to the first additional information defined in the present invention. Since the first data block comprises variable-length encoded data, the amount of data differs for each block.

Figure 7:
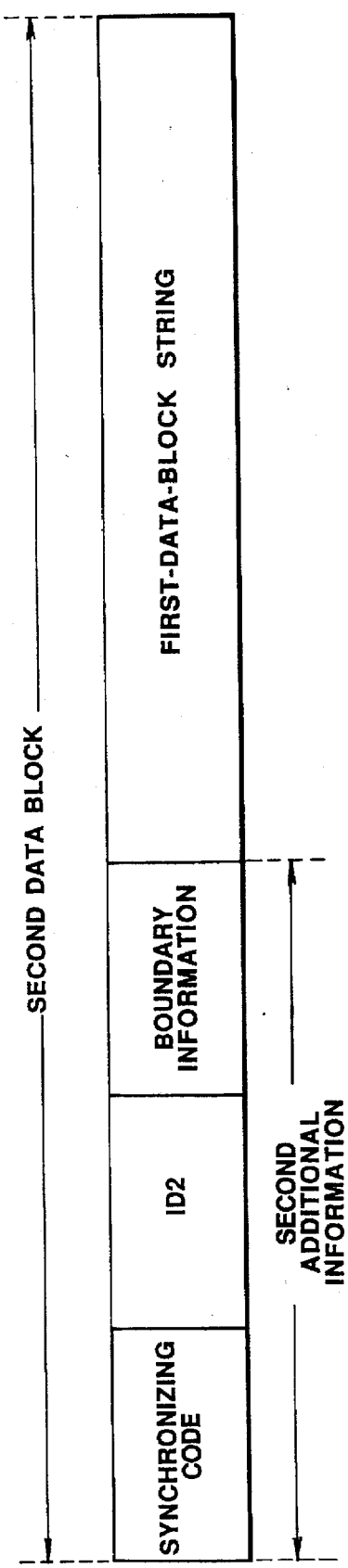
FIG. 7 is a diagram illustrating another data transmission format in the preferred embodiment.

Next, for the convenience of transmission, processing of reconstructing the data string configured in the form of first data blocks into a transmission format having a fixed length as a second data block shown in FIG. 7 is performed.

The above-described first-data-block string is sectioned after every predetermined amount of data by synchronizing-code addition circuit 11, which adds a synchronizing code to each section. ID2 addition circuit 13 adds additional information relating to the transmission of the present system, such as the number of a synchronizing block, and the like, to this data string.

Then, boundary information generated by boundary-information generation circuit 15 is inserted in the data string to form the second data block. The boundary information is information indicating the positions of a plurality of boundaries between respective first data blocks in the first-data-block string shown in FIG. 7 when the second data block is formed. By inserting this information, the decoding side can securely perform decoding processing of variable-length codes in units of a first data block. That is, even if an error is produced during data transmission and the decoding processing of variable-length codes is thereby interrupted, decoding of the data of the next first data block can be securely performed, since the position of the leading data can be determined.

In FIG. 7, the synchronizing code, ID2 and the boundary information correspond to the second additional information defined in the present invention.

After forming the second data blocks, the data string is subjected to error-correcting encoding by error-correcting encoding circuit 17. In this processing, a second error detecting or correcting code defined in the present invention is formed, that is, a parity bit for error correction is added to the data of first data blocks including image data (generated codes) subjected to compression encoding.

A parity bit for error correction may be added to the boundary information and the data of first data blocks including image data (generated codes) subjected to compression encoding.

According to the above-described formation of the first data blocks and the second data blocks, a second error detecting or correcting encoding operation defined in the present invention is performed for image data subjected to compression encoding, or image data subjected to compression encoding and the boundary information, and first and second error detecting or correcting encoding operations defined in the present invention are performed for movement information.

Data output from error-correcting encoding circuit 17 are transmitted to the reception side via transmission channel 19. For transmission channel 19, a transmission medium using a ground radio wave, an optical space or the like, such as optical fibers, a satellite, a microwave or the like, may be used in instantaneous transmission, and a recording medium, for example, a tape-like medium used in a digital VCR (video cassette recorder), a DAT (digital tape recorder) or the like, a disk-like medium, such as a floppy disk, an optical disk or the like, a solid-state medium, such as a semiconductor memory or the like, may be used in storage transmission.

The transmission rate is determined based on the amount of information of the original image, the compression ratio, and the required transmission time, and has a value between several tens of kilobits/second and several tens of megabits/second.

The data string received at the reception side via transmission channel 19 is supplied to synchronizing-code detection circuit 21, where the above-described synchronizing code is separated and detected. ID2 detection circuit 23 detects the above-described ID2, that is, additional information relating to the transmission of the present system, and also detects the attribute of each synchronizing block, and the like.

Boundary-information detection circuit 25 separates and detects the above-described boundary information. Memory 27 stores the data string in accordance with the above-described synchronizing code and ID2.

Error correction circuit 29 accesses memory 27, and corrects code errors for data within the second data blocks. When an error detecting or correcting encoding operation has been performed for boundary information as well as for encoded image data, error correction circuit 29 accesses memory 27 and a memory within boundary-information detection circuit, and corrects code errors for data within the second data blocks. In such correcting operations, the first error detecting or correcting code defined in the present invention is decoded using the check bit added by the above-described error-correcting encoding circuit 17.

Boundary-information detection circuit 25 detects a plurality of borders between respective first data blocks within the above-described second data block, and supplies memory 27, movement-information detection circuit 31 and ID1 detection circuit 35 with this information.

Movement-information detection circuit 31 detects movement information present at a predetermined position within the second data block in accordance with the boundary information. For this movement information, error correction circuit 33 executes a decoding operation of the second error detecting or correcting code using the check bit added by the above-described error-correcting encoding circuit 7. For the movement information, correction using the above-described first error detecting or correcting code has already been executed. Accordingly, in the present embodiment, two kinds of detection and correction of errors are performed for the movement information. Hence, it is possible to improve reliability of movement information decoded at the reception side, as well as to improve reliability in a decoding operation of high-efficiency encoded data (to be described later).

On the other hand, ID1 detection circuit 35 detects ID1 present at a predetermined position within the second data block, that is, various kinds of encoded parameters set during the encoding operation in accordance with the above-described boundary information, and supplies high-efficiency decoding circuit 37 with the detected data.

High-efficiency decoding circuit 37 takes out variable-length encoded data after error correction from the above-described memory 27 in accordance with the boundary information, decodes variable-length codes based on movement information after first and second error correcting operations supplied from movement detection circuit 31, and encoded parameters supplied from ID1 detection circuit 35, and outputs a digital image signal having the original amount (band) of information to D/A converter 39. Thus, an analog image signal is output from output terminal 41.

In an expanding decoding operation of variable-length data by high-efficiency decoding circuit 37, processing including movement compensation using movement information is performed. When this movement information is erroneously used, image data cannot be correctly decoded even if no error is present in the decoding operation of variable-length codes. In the present embodiment, however, since the above-described two kinds of error correcting operations are performed for movement information, image data can be reproduced using correct movement information at the reception side.

With respect to a decoding operation of variable-length codes, in the present embodiment, information of boundaries between respective first data blocks is inserted at a predetermined position within the second data block, and is transmitted. Hence, even if errors which could not be corrected remain within a certain first data block, the errors do not influence the next first data block, and therefore image data can be reproduced with a higher probability.

The present invention can be applied not only to the encoding apparatus of the system of the above-described embodiment, but can also be effectively applied to an apparatus in which a transmitted image signal is subjected to variable-length encoding in units of a region on a picture frame, and an encoding operation including movement compensation is performed.

The individual components in outline or designated by blocks in the drawings are all well-known in the image signal processing apparatus arts and their specific construction and operation are not critical to the operation or best mode for carrying out the invention.

The present invention can be executed in various forms without departing from the spirit and the main features of the invention.

For example, although in the present embodiment, a movement detection block comprises 8×8 elements, the size of the block is not limited to such a size. In addition, although in the present embodiment, the DCT transform block comprises 8×8 elements, the size of the block is not limited to such a size.

In other words, the foregoing description of the embodiment has been given for illustrative purposes only and not to be construed as imposing any limitation in every respect.

The scope of the invention is, therefore, to be determined solely by the following claims and not limited by the text of the specification, and alterations made within a scope equivalent to the scope of the claims fall within the true spirit and scope of the invention.

What is claimed is:

1. An image encoding apparatus, comprising:
    a) encoding means for encoding an input image signal;
    b) first-data-block generation means for generating first data blocks, each first data block including encoded data and first additional information,
        wherein said first-data-block generation means includes first forming means for forming, for each first data block, a first error detecting/correcting check code based on the first additional information and not on the encoded data of the respective first data block, and adding the first error detecting/correcting check code to the respective first data block;
    c) second-data-block generation means for generating second data blocks by dividing a string of the first data blocks after every predetermined amount of data to provide resulting first-data-block strings, and adding second additional information to each resulting first-data-block string to generate a corresponding one of the second data blocks; and
    d) second forming means for forming a respective second error detecting/correcting code based on each of the second data blocks and adding the respective second error detecting/correcting code to the respective second data block.

2. An image encoding apparatus according to claim 1, wherein said encoding means comprises discrete cosine transform (DCT) operation means for performing a DCT operation on the input image signal.

3. An image encoding apparatus according to claim 2, wherein said encoding means further comprises quantization means for quantizing the image data subjected to the DCT operation.

4. An image encoding apparatus according to claim 1, wherein said encoding means performs an encoding operation using movement compensation.

5. An image encoding apparatus according to claim 4, wherein the first additional information comprises movement information used by said encoding means.

6. An image encoding apparatus according to claim 1, wherein the first additional information comprises quantization parameters.

7. An image encoding method, comprising:
    an encoding step of encoding an input image signal;
    a first generating step of generating first data blocks, each first data block including encoded data and first additional information,
        wherein said first generating step includes a first forming step of forming, for each first data block, a first error detecting/correcting check code based on the first additional information and not on the encoded data of the respective first data block, and an adding step of adding the first error detecting/correcting check code to the respective first data block;
    a second generating step of generating second data blocks by dividing a string of the first data blocks after every predetermined amount of data to provide resulting first-data-block strings, and adding second additional information to each resulting first-data-block string to generate a corresponding one of the second data blocks; and
    a second forming step of forming a respective second error detecting/correcting code based on each of the second data blocks and adding the respective second error detecting/correcting code to the respective second data block.

8. An image encoding apparatus according to claim 1, wherein the second additional information comprises information relating to boundaries between respective first data blocks.

9. An image encoding apparatus according to claim 1, further comprising recording means for recording data in which the second error detecting/correcting check code is added.

10. An image encoding apparatus, comprising:
    a) large-block forming means for forming large blocks by collecting sample values of an input image signal;
    b) generation means for generating generated codes by performing an encoding operation on each of the large blocks, respectively;
    c) first forming means for forming first data blocks by adding first additional information to the generated codes;
    d) small-block forming means for dividing a string of the first data blocks into a plurality of small blocks;
    e) second forming means for forming second data blocks by adding second additional information to respective ones of the small blocks;

f) first error detecting/correcting code forming means for forming, for each second data block, a first error detecting/correcting check code based on the first additional information and not on the generated codes of the respective second data block, and adding the first error detecting/correcting check code to the respective second data block; and g) second second error detecting/correcting code forming means for forming a second error detecting/correcting check code based on each of the second data blocks including the respective first error detecting/correcting check code.

11. An image encoding apparatus according to claim 10, wherein said small-block forming means performs the dividing operation after every predetermined amount of data.

12. An image encoding apparatus according to claim 10, wherein said generation means comprises variable-length encoding means using movement compensation.

13. An image encoding apparatus according to claim 12, wherein the first additional information comprises movement information used by said encoding means.

14. An image encoding apparatus according to claim 13, wherein the first error detecting/correcting code is used for detecting and correcting an error in the first additional information.

15. An image encoding apparatus according to claim 10, wherein the second additional information comprises information relating to boundaries between respective first data blocks.

16. An image encoding apparatus according to claim 10, further comprising recording means for recording data in which the second error detecting/correcting check code is added.

17. A decoding apparatus for decoding transmitted data, the transmitted data being composed of encoded data and control data indicative of an encoding process used for encoding the encoded data, the control data including a first error detecting/correcting check code formed on the control data and not on the encoded data, the transmitted data further being divided into predetermined amounts of divided data with a respective second error detecting/correcting check code added to each of the divided data, said apparatus comprising:

a) first error-correction means for correcting error data in the input divided data using the second error detecting/correcting check codes;

b) second error-correction means for correcting errors in the control data subjected to error correction by said first error-correction means using the first error detecting/correcting check code; and d) decoding means for decoding the encoded data corrected by said first error-correction means using the control data corrected by said first and second error-correction means.

18. An image encoding method, comprising:

a large-block forming step of forming large blocks by collecting sample values of an input image signal;

a generation step of generating generated codes by performing an encoding operation on each of the large blocks, respectively;

a first forming step of forming first data blocks by adding first additional information to the generated codes;

a small-block forming step of dividing a string of the first data blocks into a plurality of small blocks;

a second forming step of forming second data blocks by adding second additional information to respective ones of the small blocks;

a first error detecting/correcting code forming step of forming, for each second data block, a first error detecting/correcting check code based on the first additional information and not on the generated codes of the respective second data block, and adding the first error detecting/correcting check code to the respective second data block; and a second error detecting/correcting code forming step of forming a second error detecting/correcting check code based on each of the second data blocks including the respective first error detecting/correcting check code.

19. A decoding method for decoding transmitted data, the transmitted data being composed of encoded data and control data indicative of an encoding process used for encoding the encoded data, the control data including a first error detecting/correcting check code formed on the control data and not on the encoded data, the transmitted data further being divided into predetermined amounts of divided data with a respective second error detecting/correcting check code added to each of the divided data, said method comprising:

a first error-correction step of correcting error data in the input divided data using the second error detecting/correcting check codes;

a second error-correction step of correcting errors in the control data subjected to error correction by said first error-correction step using the first error detecting/ correcting check code; and a decoding step of decoding the encoded data corrected by said first error-correction step using the control data corrected by said first and second error-correction steps.

20. An image processing method, comprising:

a input step of inputting image data;

an encoding step of encoding the image data input by said input step, using movement compensation, to provide encoded image data;

a first forming step of forming a first error detecting/ correcting check code based on movement information used for the movement compensation and not on the encoded image data; and a second forming step of forming a second error detecting/correcting check code based on the encoded image data, the movement information and the first error detecting/correcting check code.

21. An image processing apparatus, comprising:

a) input means for inputting image data;

b) encoding means for encoding the image data input by said input means, using movement compensation, to provide encoded image data;

c) first forming means for forming a first error detecting/ correcting check code based on movement information used for the movement compensation and not on the encoded image data; and d) second forming means for forming a second error detecting/correcting check code based on the encoded image data, the movement information and the first error detecting/correcting check code.

22. An apparatus according to claim 21, wherein said encoding means comprises discrete cosine transform (DCT) operation means for performing a DCT operation on the image data.

* * * * *

UNITED STATES PATENT AND TRADEMARK OFFICE
CERTIFICATE OF CORRECTION

PATENT NO. : 5,684,893
DATED : November 4, 1997
INVENTOR(S) : AKIHIRO SHIKAKURA

It is certified that error appears in the above-identified patent and that said Letters Patent is hereby corrected as shown below:

<u>COLUMN 2</u>

Line 37, "aspects" should read --aspect,--;
    Line 45, "data" should read --data,--; and
    Line 46, "strings" should read --string,--.

<u>COLUMN 5</u>

Line 6, "processing" should read --a process--.

<u>COLUMN 8</u>

Line 11, "image data" should read --input image signal--.

<u>COLUMN 9</u>

Line 50, "d)" should read --c)--.

Signed and Sealed this

Twelfth Day of May, 1998

*Attest:*

BRUCE LEHMAN

*Attesting Officer*      Commissioner of Patents and Trademarks